May 23, 1967 A. J. FOWELL 3,320,830
COUPLING
Filed Sept. 30, 1964 2 Sheets-Sheet 1

INVENTOR.
Andrew J. Fowell
BY
ATTORNEY

May 23, 1967  A. J. FOWELL  3,320,830

COUPLING

Filed Sept. 30, 1964  2 Sheets-Sheet 2

United States Patent Office 3,320,830
Patented May 23, 1967

3,320,830
COUPLING
Andrew J. Fowell, South Bound Brook, N.J., assignor to American Radiator & Standard Sanitary Corporation, New York, N.Y., a corporation of Delaware
Filed Sept. 30, 1964, Ser. No. 400,347
7 Claims. (Cl. 74—773)

ABSTRACT OF THE DISCLOSURE

A driving shaft carries axles supporting fluid containers and planet gears which engage a sun gear connected to a driven shaft. Fluid is fed to the fluid containers so that the centrifugal force exerted by the so-contained fluid prevents rotation of the planet gears while they revolve about the sun gear and therefore cause the sun gear to rotate.

---

Figure 1:
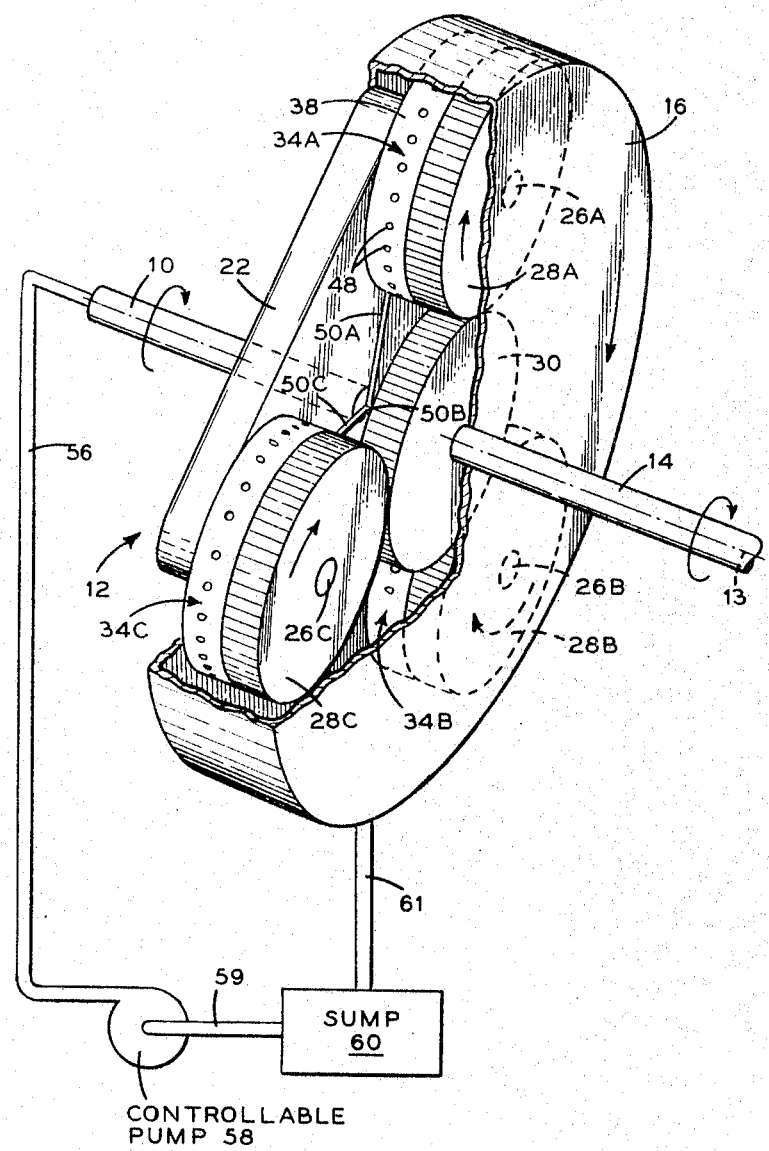

This invention pertains to coupling a driving element to a driven element and more particularly the controlled coupling of a driving shaft to a driven shaft.

In many rotating machines it is necessary to controllably connect a rotary source of power to a rotatable member so that the rotatable member may be driven. Such machinery may be various machine tools as well as automotive equipment. At present, various kinds of clutches and hydraulic drives are used. However, such devices waste power because of slip, friction, etc. Furthermore, these devices often require considerable declutching time, and often can only be engaged below certain speeds and under limited loads.

It is, accordingly, a general object of the invention to provide an improved coupling between a driving element and a driven element.

It is another object of the invention to provide an improved coupling between a driving element and a driven element which has only a fraction of a percent of slip.

It is a further object of the invention to provide an improved coupling between a driving element and a driven element which can be rapidly disengaged.

It is yet another object of the invention to provide a coupling between a driving element and a driven element which can be engaged over a broad range of speed and load conditions.

It is yet a further object of the invention to provide a coupling between a driving element and a driven element wherein the driving element can be started unloaded and the driven element be gradually brought up to speed so that high inertia driven elements can be handled with moderate torque driving element and simplified starting equipment.

Still another object of the invention is to provide a torque limiting combination of a coupling cooperating with a driving element and a driven element to prevent equipment overload.

Still a further object of the invention is to provide a coupling which prevents the transmission of shock forces between a driving element and a driven element.

Briefly, the invention contemplates drivingly coupling a rotating planetary gear means to a sun gear means, wherein the planetary gear means is meshingly rotatable over the sun gear means, by applying a torque derived from a centrifugal force to the planetary gear means so that the planetary gear means rotates the sun gear means.

Other aspects of the invention are concerned with the generation of the centrifugal force by a controllably variable mass revolving about a central axis and utilizing a component of the centrifugal force to generate a torque which acts on the planet gear means about their respective axis of rotation.

Other objects, features and advantages of the invention will be apparent from the following detailed description when read with the accompanying drawing which shows, by way of example and not limitation, apparatus for practicing the invention.

Figure 2:
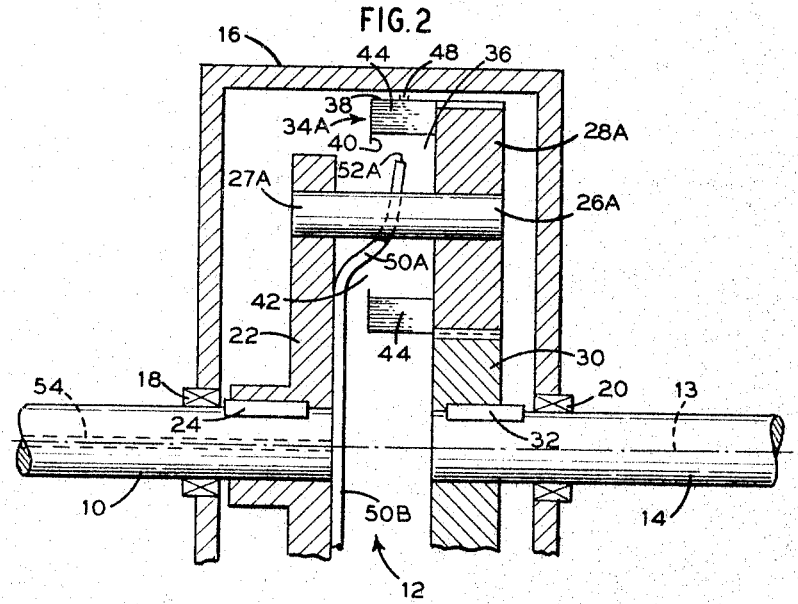
Figure 3:
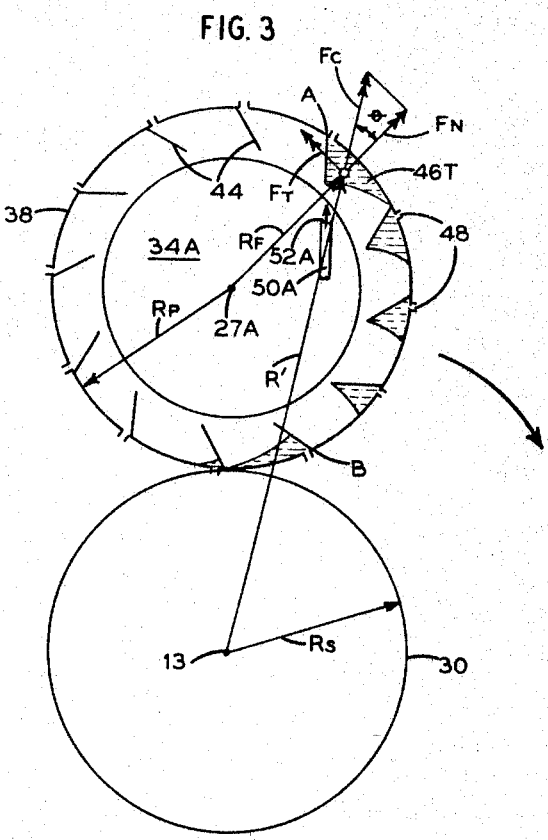

In the drawing:

FIG. 1 shows a perspective view, partially broken away, and partially in schematic of a fluid coupling including rotatably driven planetary gears responsive to the torque generated by masses of fluid and a sun gear for controllably connecting a driving shaft to a driven shaft; and FIG. 2 is an axial section of a portion of the coupling of FIG. 1; and FIG. 3 is a schematic representation of the coupling of FIG. 1 which shows the action of forces and torques generated therein.

Referring to FIG. 1, there is shown a driving element in the form of an input shaft 10 controllably connected by a coupling 12 to a driven element in the form of an output shaft 14. Input shaft 10 is rotatably driven about its axis by a rotary power source (not shown). Output shaft 14 is driven about its axis when coupling 12 is engaged. At that time, both shafts rotate about a common drive axis 13. When coupling 12 is disengaged output shaft 14 does not rotate.

Coupling 12 comprises a housing 16, through which shafts 10 and 14 extend. Bearings 18 and 20 (see FIG. 2) support shafts 10 and 14, respectively, in housing 16. Within housing 16 coupling 12 includes a support member in the form of an input drive plate 22 keyed at 24 to drive shaft 10. Mounted on drive plate 22 are a plurality of axles 26. Mounted on each axle 26 is a planet gear 28. A typical planet gear 28A rotates about the planet axis 27A. Therefore either axle 26A is fixed to drive plate 22 and planet gear 28A is provided with bearings to rotate around axle 26A; or planet gear 28A is fixed to axle 26A which is provided with bearings for rotation in drive plate 22. Meshingly engaging each of the planet gears 26 is a sun gear 30 keyed at 32 to output shaft 14.

Before describing the remainder of coupling 12 its mechanical operation will be briefly discussed. Assume input shaft 10 is being rotatably driven and output shaft 14 is loaded. Accordingly, input shaft 10 causes drive plate 22 to rotate about drive axis 13, and axles 26 and planet gears 28 revolve about drive axis 13. Since the planet gears 28 are freely rotatable about the planet axis 27 they merely meshingly roll over sun gear 30 and no rotary power is transferred to output shaft 14. However, if planet gears 28 were not freely rotatable about the planet axis 27 and merely revolved about drive axis 13 there would be no relative movement between the planet gears 28 and the sun gear 30. Therefore, the rotary power from input shaft 10 would be transferred via drive plate 22 and planet gears 28 to sun gear 30 causing output shaft 14 to rotate.

The remaining portions of the coupling 12 are concerned with controlling the rotation of planet gears 28 about the planet axes 27. Fixed to each of the planet gears 28 is a variable mass means in the form of a bucket wheel 34. A typical bucket wheel 34A has an end wall 36 which may be a face of planet gear 28A, a cylindrical side wall 38, and an annular end wall 40 provided with an opening 42. Angularly extending, in the direction of revolution of the bucket wheel 34 about the drive axis 13 (see FIG. 3), inward from the side wall 38 and abutting the end walls 36 and 40 are a plurality of fins or vanes 44. The region defined by two successive vanes 44, the end walls 36 and 40, and the side wall 38 is a container 46 for fluid. There is included in the side wall 38 a plurality of outlets 48, at least one for each fluid container 46. It should be noted that bucket wheel 34A is coaxially fixed to planet gear 28A, but that fluid containers 46 are radially displaced from planet axis 27A and are revolvable about drive axis 13 (see FIG. 3).

The fluid containers 46 are controllably supplied fluid by fluid conduits 50, one for each bucket wheel 34. A typical fluid conduit 50A (see FIG. 2) is fixed relative to drive plate 22 and extends through opening 42 into the interior of bucket wheel 34 with an outlet 52A directed toward the inner surface of side wall 38. The other end of conduit 50A is connected to one end of the passageway 54 in input shaft 10. The other end of passageway 54 is connected by a rotary fluid coupling to conduit 56 which is connected to controllable pump 58 (see FIG. 1). Pump 58 is connected via conduit 59 to sump 60 which is connected via pipe 61 to housing 16.

The fluid circuit will now be described. When pump 58 is actuated, fluid is drawn from sump 60 via conduit 59 and fed via conduit 56 and passageway 54 (FIG. 2) to conduits 50. The fluid is delivered from typical outlet 52A to the fluid container 46 then opposite outlet 52A (see FIG. 3). Fluid collects in container 46. As the bucket wheel 34A rotates clockwise about planet axis 27A fluid will collect in the fluid containers 46 that are instantaneously between points A and B. As a container moves beyond point B fluid bleeds from its outlet 48 and over the edge of vane 44 into the following container. The fluid bleeding from outlet 48 falls to the bottom of housing 16 (FIG. 1) and passes through pipe 61 to sump 60. It should be noted that a small amount of fluid is in each of the fluid containers 46 between the points A and B.

The theory concerning the engagement of the coupling will now be described with respect to FIG. 3. When fluid is being pumped each of the fluid containers 46 between the points A and B contains fluid. The mass of the fluid in the typical container 46T is also revolving about the drive axis 13 with an angular velocity equal to the angular velocity of the driving shaft. The center of mass of the fluid is a distance R' from axis 13. Therefore, if the fluid has a mass M and the angular velocity is $w_1$ then it exerts a centrifugal force $F_c = MR'w_1^2$. The centrifugal force $F_c$ can be resolved into a force $F_t$ tangent to the circumference of the planet gear and a normal force $F_n$. The tangential force $F_t$ is displaced from planet axis 26A by a radial distance $R_f$ causing a retarding torque $F_t \times R_f$ on the planet gear.

The planet gear 28 then exerts a torque on the sun gear 30 causing the output shaft 14 to rotate. As long as the fluid containers 46 contain sufficient fluid for the retarding torque to be greater than $(R_p/R_s) \times$ the output shaft torque, the rotation of the planet gears 28 about their planet axes 27 will slow to a stop. During this slowing down, the sun gear 30 is speeding up in rotation about drive axis 13 so that when the planet gears 28 are no longer rotating about the planet axes 27 the speed of rotation of the output shaft 14 equals the speed of rotation of the input shaft 10. At this time, there will be no relaive motion between the planet gears and the sun gears since the entire apparatus rotates as if rigid and consequently will be quiet.

It should be noted that the only absorbed power is that required to pump the fluid around the circuit. Accordingly, the coupling has a minimum of losses and is highly efficient.

Several dynamic considerations will now be discussed. If the load on the output shaft 14 increases, the fluid in the containers 46 will move clockwise increasing the angle O, consequently, the locking torque on the planet gear increases and the lockup state is stable. If the design torque on the output shaft 14 is exceeded it becomes too large to be balanced by the maximum locking torque of the planet gears. The planet gears will rotate about their planet axes preventing overloading of the input power supply.

It should be noted that the size of the outlets 48 which permit the bleeding of fluid from the containers 46 determine the declutching time of the coupling, that is, the larger their cross-section the faster the disengagement when the fluid supply is cut off. Furthermore, in order to permit engagement at full load the rate of supply of fluid to the container 46 must exceed considerably the drain rate. Therefore, at lock up excess fluid will spill from the opening 42 in end wall 40 of the bucket wheel 34. However, this fluid merely drips to the bottom of the housing 16 and collects in sump 60.

It should be noted that the relative dimensions of the elements will vary according to the use required of the coupling. For example, in one application, the diameter of the planet gears was twice the diameter of the sun gear. Furthermore, although three planet gears have been shown, more or less can be employed. In addition, the fluid feed circuit can be varied dependant on specific requirements.

While only one embodiment of the invention has been shown and described in detail there will now be obvious to those skilled in the art many modifications and variations satisfying many or all of the objects of the invention, but which do not depart from the spirit thereof as defined in the appended claims.

What is claimed is:

1. Apparatus for coupling a rotatable drive shaft to a rotatable driven shaft comprising a support member fixed to said drive shaft and rotatable therewith, a plurality of axle means rotatably journaled in said support member at regions radially displaced from said drive shaft, a plurality of planet gears, each of said planet gears being fixedly mounted on one of said axle means, a plurality of fluid container means, each of said fluid container means including a cylindrical peripheral wall member, a first end wall member, an annular second end wall member provided with an opening and a plurality of vanes connected to and extending inward from said cylindrical wall member and in contact with said first and second end wall members for providing a plurality of circularly arrayed fluid compartments, means for coaxially connecting each of said fluid container means to one of said axle means respectively so that a torque is exertable on the associated planet gear about its axle means, said torque being related to the centrifugal force resulting from the mass of the fluid in said fluid compartment revolving about the axis of said drive shaft, means for delivering fluid via the openings of said annular second wall members to said fluid compartments and a sun gear connected to said driven shaft for meshing with said planet gears.

2. Apparatus for coupling a rotatable drive shaft to a rotatable driven shaft comprising a support member fixed to said drive shaft and rotatable therewith, a plurality of axle means rotatably journaled in said support member at regions radially displaced from said drive shaft, a plurality of planet gears, each of said planet gears being fixedly mounted on one of said axle means, a plurality of fluid container means, each of said fluid container means including a cylindrical peripheral wall member, a first end wall member, an annular second end wall member provided with an opening and a plurality of vanes connected to and extending inward from said cylindrical wall member and in contact with said first and second end wall member for providing a plurality of circularly arrayed fluid compartments, means for coaxially connecting each of said fluid container means to one of said axle means respectively so that a torque is exertable on the associated planet gear about its axle means, said torque being related to the centrifugal force resulting from the mass of the fluid in said fluid compartment revolving about the axis of said drive shaft, means for delivering fluid via the openings in said annular second wall members to said fluid compartments, said cylindrical wall member being provided with a plurality of fluid outlets, at least one fluid outlet for each fluid compartment, and a sun gear connected to said driven shaft for meshing with said planet gears.

3. Apparatus for coupling a rotatable drive shaft to a rotatable driven shaft comprising a support member fixed to said drive shaft and rotatable therewith, a plurality of axle means rotatably journaled in said support member at regions radially displaced from said drive shaft, a plurality of planet gears being fixedly mounted on one of said axle means, a plurality of fluid container means, each of said fluid container means including a cylindrical peripheral wall member, a first end wall member, an annular second end wall member provided with an opening and a plurality of vanes connected to and extending inward from said cylindrical wall member and in contact with said first and second end wall members for providing a plurality of circularly arrayed fluid compartments, means for coaxially connecting each of said fluid container means to one of said axle means respectively so that a torque is exertable on the associated planet gear about its axle means, said torque being related to the centrifugal force resulting from the mass of the fluid in said fluid compartment revolving about the axis of said drive shaft, a fluid passageway within said drive shaft and adapted to receive fluid, fluid conduit means extending from said fluid passageway through the opening in the annular second end wall member of each of said fluid container means and including an outlet directed toward the cylindrical wall member thereof, and a sun gear connected to said driven shaft for meshing with said planet gears, and pump means for delivering fluid under pressure to said fluid passageway.

4. Apparatus for coupling a rotatable drive shaft to a rotatable therewith, a plurality of axle means rotatably journaled in said support member at regions radially displaced from said drive shaft, a plurality of planet gears, each of said planet gears being fixedly mounted on one of said axle means, a plurality of fluid container means, each of said fluid container means including a cylindrical peripheral wall member, a first end wall member, an annular second end wall member provided with an opening and a plurality of vanes connected to and extending inward from said cylindrical wall member and in contact with said first and second end wall members for providing a plurality of circularly arrayed fluid compartments, means for coaxially connecting each of said fluid container means to one of said axle means respectively so that a torque is exertable on the associated planet gear about its axle means, said torque being related to the centrifugal force resulting from the mass of the fluid in said fluid compartment revolving about the axis of said drive shaft, a fluid passageway within said drive shaft and adapted to receive fluid, fluid conduit means extending from said fluid passageway through the opening in the annular second end wall member of each of said fluid container means and including an outlet directed toward the cylindrical wall member thereof, said cylindrical wall member being provided with a plurality of fluid outlets, at least one fluid outlet for each fluid compartment, and a sun gear connected to said driven shaft for meshing with said planet gears, and pump means for delivering fluid under pressure to said fluid passageway.

5. The apparatus of claim 4 further comprising a housing enclosing said planet and sun gears and said fluid containers, an outlet in said housing and conduit means connecting said housing outlet to the input of said pump means whereby fluid flowing from the outlets of said fluid compartments is collected in said housing and re-delivered by said pump means to said fluid passageway.

6. The apparatus of claim 5 further including means for controlling the operation of said pump means.

7. The apparatus of claim 6 wherein said fluid outlets are proportioned to drain fluid at a rate less than the rate at which fluid is delivered to said fluid compartments whereby excess fluid spills from the opening in said annular second walls to permit engagement at full load on said driven shaft.

References Cited by the Examiner

UNITED STATES PATENTS

| 1,666,152 | 4/1928 | Strigl | 74—774 |
|---|---|---|---|
| 1,691,612 | 11/1928 | Reece et al. | 74—752 |
| 1,866,002 | 7/1932 | Anderson | 74—774 |
| 2,061,867 | 11/1936 | De Manyck | 74—752 |
| 2,205,329 | 6/1940 | Wohlenhaus | 74—752 X |
| 2,293,547 | 8/1942 | Hobbs | 74—752 |
| 2,565,551 | 8/1951 | Dougherty | 74—687 |
| 2,692,517 | 10/1954 | O'Hary | 74—252 |
| 2,891,420 | 6/1959 | Simmons | 74—752 |
| 3,077,793 | 2/1963 | Cancrinus | 74—774 X |
| 3,126,764 | 3/1964 | Cancrinus | 74—752 |
| 3,251,248 | 5/1966 | Cancrinus | 74—752 |

FOREIGN PATENTS

| 599,390 | 1/1926 | France. |
|---|---|---|
| 617,323 | 1/1926 | France. |
| 1,348,300 | 1/1926 | France. |
| 1,351,386 | 1/1926 | France. |

DONLEY J. STOCKING, *Primary Examiner.*

DAVID J. WILLIAMOWSKY, *Examiner.*

J. R. BENEFIEL, *Assistant Examiner.*